US010592927B2

(12) United States Patent
Cheng et al.

(10) Patent No.: US 10,592,927 B2
(45) Date of Patent: Mar. 17, 2020

(54) ADVERTISEMENT TARGETING FOR AN INTEREST TOPIC

(71) Applicant: Facebook, Inc., Menlo Park, CA (US)

(72) Inventors: Haibin Cheng, San Jose, CA (US); Dominique Marcel Georgette Van de Sompel, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 323 days.

(21) Appl. No.: 14/881,874

(22) Filed: Oct. 13, 2015

(65) Prior Publication Data

US 2017/0103418 A1   Apr. 13, 2017

(51) Int. Cl.
  *G06Q 30/02*   (2012.01)
  *G06F 16/95*   (2019.01)
  *G06F 16/9535*  (2019.01)

(52) U.S. Cl.
  CPC ..... *G06Q 30/0255* (2013.01); *G06F 16/9535* (2019.01); *G06Q 30/0251* (2013.01); *G06Q 30/0275* (2013.01)

(58) Field of Classification Search
  CPC .......... G06Q 30/0255; G06Q 30/0251; G06Q 30/0275; G06F 16/9535
  See application file for complete search history.

(56) References Cited

U.S. PATENT DOCUMENTS

| | | | | |
|---|---|---|---|---|
| 7,177,904 | B1 * | 2/2007 | Mathur | G06F 21/6245 709/203 |
| 7,299,195 | B1 * | 11/2007 | Tawakol | G06Q 30/02 705/14.71 |
| 8,380,691 | B1 * | 2/2013 | Tunguz-Zawislak | G06Q 50/01 707/705 |
| 2003/0212648 | A1 * | 11/2003 | Cunningham | G06F 17/2247 |
| 2004/0133471 | A1 * | 7/2004 | Pisaris-Henderson | G06Q 30/02 705/14.41 |
| 2007/0088720 | A1 * | 4/2007 | Neuneier | G06F 17/30899 |
| 2009/0234713 | A1 * | 9/2009 | Bi | G06Q 30/02 705/14.54 |
| 2011/0029505 | A1 * | 2/2011 | Scholz | G06F 17/30539 707/711 |
| 2011/0167486 | A1 * | 7/2011 | Ayloo | G06Q 10/00 726/7 |

(Continued)

OTHER PUBLICATIONS

Coffey, "Internet Audience Measurement: A Practitioner's View," Journal of Interactive Advertising, vol. 1, No. 2, Spring 2001,8 pages.*

*Primary Examiner* — Raquel Alvarez
(74) *Attorney, Agent, or Firm* — Fenwick & West LLP (57) ABSTRACT

An advertising system identifies users associated with an interest topic and generates a list of such users in which all advertising accounts are proportionately represented in the list. Such users are identified by recording user-page access data to each page in a cluster of pages associated with the interest topic. A list of user-account associations is generated by grouping the user-page access data by the advertising account associated with each page. The list is then optimized so a proportion of user-account associations for each advertising account is less than or equal to a predetermined threshold. This ensures that no one advertising account is overrepresented in the list. Using the optimized list, the advertising system can target users associated with the list with advertisements related to the interest topic.

18 Claims, 7 Drawing Sheets

Jewelry Cluster

Interest List Before Optimization

| Account 1 | ID1, ID2, ID3, ..., ID38, ID39, ID40 |
|---|---|
| Account 2 | ID38, ID39, ID41, ..., ID78, ID79 |
| Account 3 | ID80, ..., ID89 |
| Account 4 | ID90, ..., ID100 |
| Total | R user-account associations |

Interest List After Optimization

| Account 1 | ID1, ID2, ID3, ..., ID32 |
|---|---|
| Account 2 | ID41, ..., ID78, ID79 |
| Account 3 | ID80, ..., ID89 |
| Account 4 | ID90, ..., ID100 |
| Total | U user-account associations |

Proportion of User-Account Associations Before Optimization

Proportion of User-Account Associations After Optimization (56) References Cited

U.S. PATENT DOCUMENTS

| | | | |
|---|---|---|---|
| 2012/0102520 A1* | 4/2012 | Motzel | H04N 21/2743 |
| | | | 725/30 |
| 2012/0116864 A1* | 5/2012 | Jalili | G06Q 30/02 |
| | | | 705/14.35 |
| 2015/0012350 A1* | 1/2015 | Li | G06Q 30/0243 |
| | | | 705/14.42 |
| 2016/0277351 A1* | 9/2016 | Wang | H04L 51/32 |
| 2016/0300262 A1* | 10/2016 | Gao | G06Q 30/0269 |
| 2017/0070570 A1* | 3/2017 | Jalili | H04L 67/1097 |

* cited by examiner

Jewelry Cluster

| User | Page | Account |
|---|---|---|
| Sally | jewelry.com | 123 |
| Jim | jewelry.com | 123 |
| Toney | jewelry.com/necklaces | 123 |
| Sally | jewelry.com/necklaces | 123 |
| Tobias | prettythings.com | 123 |
| Claire | necklaces.com | 526 |
| Jane | necklaces.com/gold | 526 |
| Mary | necklaces.com/silver | 526 |
| Edwin | rings.com | 725 |
| Janet | rings.com/diamonds | 725 |
| Kanye | rings.com/sapphire | 725 |
| East | diamonds.com | 725 |

FIG. 5

Jewelry Cluster

Interest List Before Optimization

| | |
|---|---|
| Account 1 | ID1, ID2, ID3, ..., ID38, ID39, ID40 |
| Account 2 | ID38, ID39, ID41, ..., ID78, ID79 |
| Account 3 | ID80, ..., ID89 |
| Account 4 | ID90, ..., ID100 |
| Total | R user-account associations |

Interest List After Optimization

| | |
|---|---|
| Account 1 | ID1, ID2, ID3, ..., ID32 |
| Account 2 | ID41, ..., ID78, ID79 |
| Account 3 | ID80, ..., ID89 |
| Account 4 | ID90, ..., ID100 |
| Total | U user-account associations |

Proportion of User-Account Associations Before Optimization

Proportion of User-Account Associations After Optimization

ADVERTISEMENT TARGETING FOR AN INTEREST TOPIC

BACKGROUND

This invention relates generally to generating a list of users for advertisement targeting, and more particularly to generating a list of users associated with an interest topic.

It is advantageous for advertisers to selectively target advertisements to a group of users who have an interest in a common topic. A user's access to a certain page typically represents the user's general interest in a topic related to the content of the webpage, and user access to pages associated with the interest topic are useful for advertisers who are looking to target users with an advertisement related to the interest topic.

However, not only is it difficult to identify which set of pages are associated with a given interest topic, but even if such pages are identified the user access data may be disproportionately represented by a small subset of advertising accounts. In an advertising system, an advertising account may be associated with a set of related pages, and a disproportionate number of users accessing pages associated with a single advertising account may not be useful for the owner of the advertising account. For example, two distinct pages that contain different brands of product lines may be owned by the same owner and thus, the pages may be associated with the same advertising account of the owner. A list of user access data mostly associated with the advertising account of the owner is not useful if the owner of the advertising account is primarily looking to target advertisements to users who are unaware of its products. Alternatively, another advertiser may not wish to advertise to a list of users associated with an interest if that list is predominantly derived from users accessing pages of a few content owners.

SUMMARY

An advertising system identifies users associated with an interest topic and generates a list of such users in which all advertising accounts are proportionately represented in the list. Such users are identified by identifying when a user accesses a page in a cluster of pages associated with the interest topic. A list of user-account associations is generated by grouping the user-page access data by the advertising account associated with each page, where each advertising account is associated with a set of pages that are related to each other. The set of pages may belong to a same owner or may be related through common groupings of products and services that are represented in the set of pages. The list is then optimized so a proportion of user-account associations for each advertising account is less than or equal to a predetermined threshold. This ensures that no one advertising account is overrepresented in the list.

In one embodiment, the cluster of pages associated with the interest topic is constructed by first identifying seed pages associated with the interest topic, and then assigning new pages to the cluster based on the seed pages. A set of features, such as metadata, bag-of-words, n-grams, etc., is extracted from an unknown page as well as the seed pages. If a similarity criterion is met between the set of features of the unknown page and the set of features from the seed pages, the unknown page is assigned to the cluster associated with the interest topic.

Using the optimized list, the advertising system can target users associated with the list with advertisements related to the interest topic. In one embodiment, the advertising system identifies an advertising opportunity for the user associated with the list, identifies an advertisement targeting the list, and adds the identified advertisement to an advertisement auction for the advertising opportunity. In another embodiment, the advertising system may provide the list to an advertiser that uses the list to target users associated with the list.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
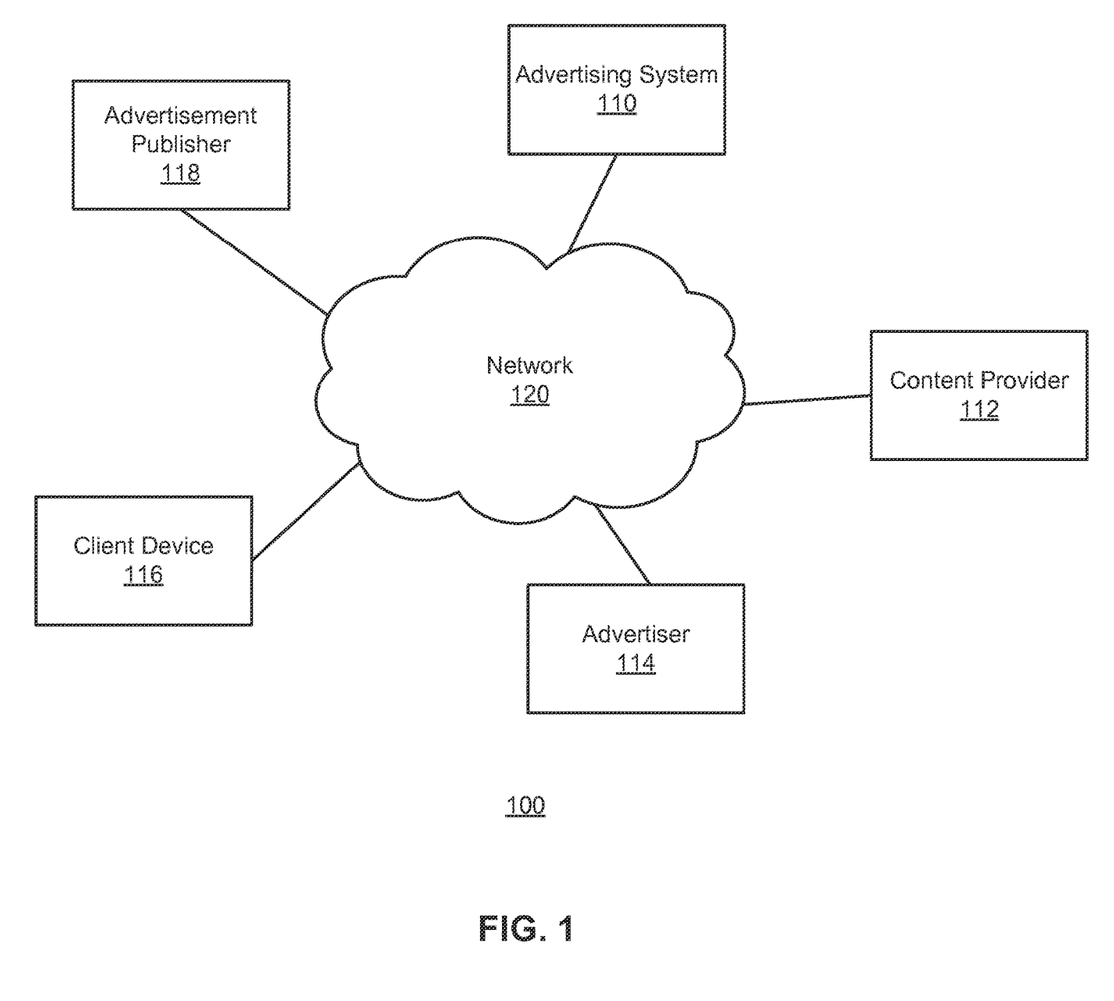
FIG. 1 is a high level block diagram of a system environment for an advertising system.

FIG. 1 is a high level block diagram of a system environment 100 for an advertising system 110. The system environment 100 shown by FIG. 1 comprises an advertising system 110, one or more content provider pages 112, one or more advertisers 114, one or more client devices 116, one or more advertisement publishers 118, and a network 120. In alternative configurations, different or additional components may be included in the system environment. The embodiments described herein can be adapted to online systems that are not social networking systems.

The client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the advertising system 110. For example, a client device 116 executes a browser application to enable interaction between the client device 116 and the advertiser 114. In another embodiment, a client device 116 interacts with the advertising system 110 through an application programming interface (API) running on a native operating system of the client device 110, such as IOS® or ANDROID™.

In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more advertisers 114 provide advertisements to the advertising system 110 to be served to the client devices 116. The advertisers specify an advertising campaign associated with the advertisements to the advertising system 110. Each advertiser 114 may provide many concurrent ad campaigns to the advertising system 110, though for simplicity in this disclosure, each advertiser 114 is treated as providing a single advertising campaign. Each advertiser 114 may be associated with an advertising account that employs the advertising system 110 to promote products or services of the advertising account to users of client devices 116.

One or more content providers 112 provide content accessed by client devices 116 that are of interest to users of the client devices 116. Typically the content provider 112 provides the content on individual pages. Each page of the content provider 112 provides content related to the products or services of the owner of the page of the content provider 112. The pages of the content provider pages 112 may be accessible via unique links, such as a universal resource locator (URL). The links may be organized in one or more domains and in folders or subdomains of the domains.

Different pages across one or more content providers 112 may be associated with a single owner. For example, pages that are part of the same domain may be associated with the owner of the domain. As another example, pages from different content providers 112 may be associated with the same owner that owns multiple domains, each associated with the pages of different content providers 112.

Each page of a content provider 112 may be associated with an advertising account in the advertising system 110. An advertising account is associated with a set of related pages. The set of pages may be related by being associated with the same owner. For example, an owner associated with a content provider 112 may have an advertising account with the advertising system 110 to target users with advertisements related to the content provider 112. As another example, a page of a content provider 112 may be associated with an advertising account if the advertising account is associated with another content provider 112 of the same owner. The set of pages may also be related by common groupings of products and services that are represented in the set of pages. For example, an advertising account may be associated with a set of pages in which the products or services in the pages are cross-sold to one another.

The advertisement publisher 118 is a system that provides content to a client device on which advertisements from an advertising system 110 are placed. The ad publisher refers clients to the advertising system 110 to fill advertising slots on a page of the ad publisher. Example ad publishers include social networking systems, video streaming systems, news distribution systems, forums, and any other electronic system or webpage hosting service that provides content to users and displays ads through a referral to the advertising system 110.

The advertising system 110 provides advertisements to client devices 116. An embodiment of the advertising system 110 is provided below in conjunction with FIG. 2. The advertising system 110 selects advertisements from advertising campaigns provided by advertisers 114 responsive to ad queries requested by the client devices 116. When selecting advertisements, the advertising system 110 may generate a list of user-advertising account associations for an interest topic by recording user-page access data to content provider pages 112 and their associated advertising accounts. The advertising system 110 may target advertisements related to the interest topic to users associated with the user-account association list. The advertising system 110 may provide advertisements for client devices accessing the advertising system 110 and operate as an ad publisher, or may provide advertisements for another ad publisher 118.

Figure 2:
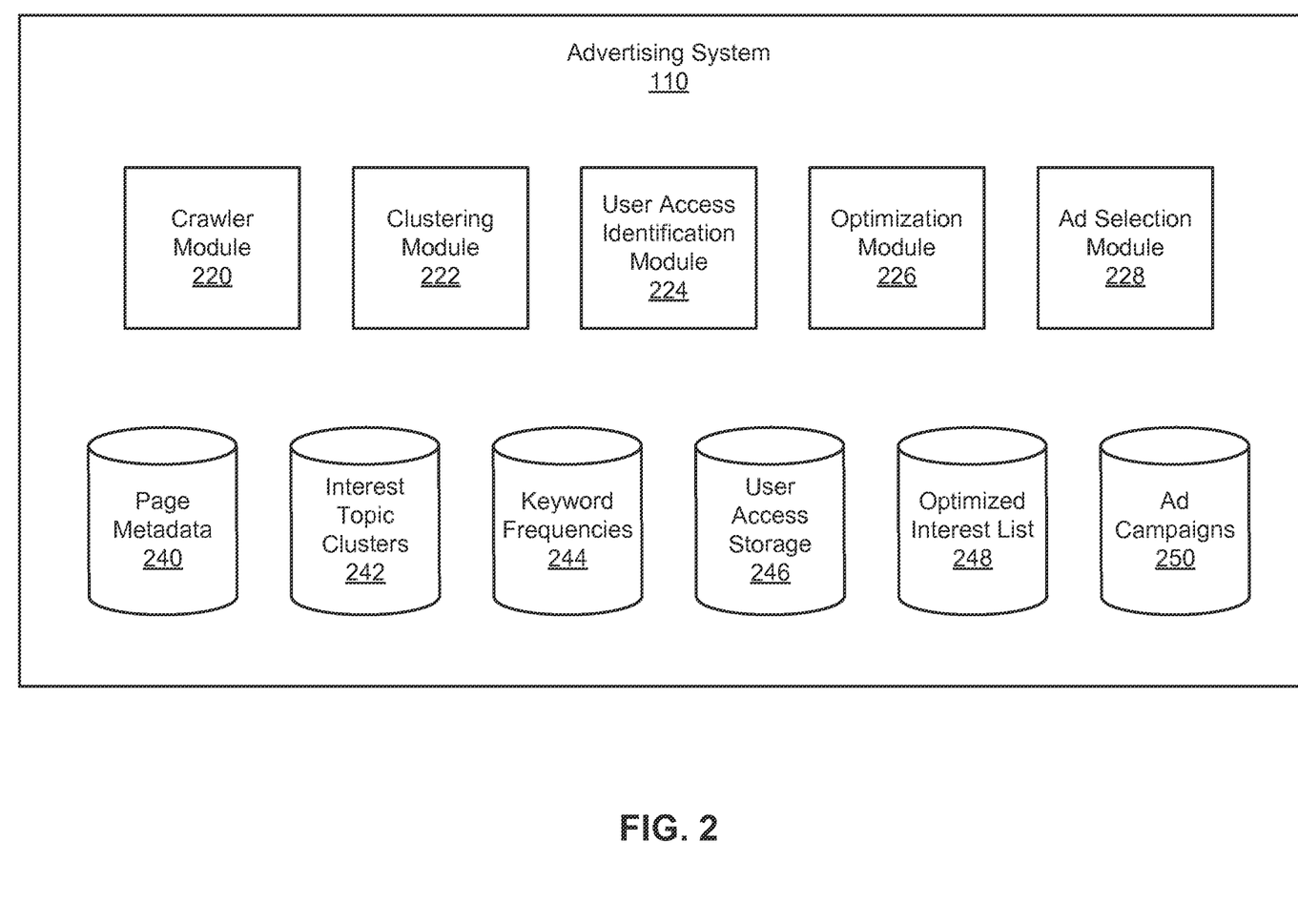
FIG. 2 is an example block diagram of an architecture of the advertising system.

FIG. 2 is an example block diagram of an architecture of the advertising system. In the example shown in FIG. 2, the advertising system 110 includes a crawler module 220, a clustering module 222, a user access identification module 224, an optimization module 226, and an ad selection module 228. The advertising system 110 also includes page metadata 240, interest topic clusters 242, keyword frequencies 244, user access storage 246, an optimized interest list 248, and ad campaigns 250. Some embodiments of the advertising system 110 have different components than those described in conjunction with FIG. 2. Similarly, the functions further described below may be distributed among components of the advertising system 110 in a different manner than is described here.

The crawler module 220 extracts data such as HTML metadata, keywords, etc. of a page. To extract this data, the crawler module 220 identifies a subject page and accesses the page to retrieve the page content, which may be in a mark-up language, such as HTML. The crawler module 220 subsequently analyzes the HTML to extract terms and other data from the page content. The crawler module 220 stores the extracted data in page metadata 240.

The clustering module 222 identifies a cluster of content provider pages 112 associated with an interest topic by first identifying seed pages associated with the interest topic, and then assigning new pages to the cluster based on the seed pages. In one embodiment, the seed pages may be manually determined by a human analyst based on the content of the pages. The clustering module 222 stores mappings of interest topics and clusters of pages associated with each of the interest topics in interest topic clusters 242.

The clustering module 222 extracts a set of page features, such as metadata, keywords, bag-of-words, n-grams, and other features, for seed pages and unknown pages using the extracted data in page metadata 240. The clustering module 222 trains a clustering model for each interest topic using the page features of the seed pages and unknown pages. The clustering model determines whether an unknown page can be assigned to the cluster associated with the interest topic. If a similarity criterion is met between the page features of the unknown page and the page features of the seed pages, the unknown page is assigned to the cluster associated with the interest topic. The clustering module 222 may store a list of keyword frequencies 244 for each interest topic cluster for use in the training of the clustering model.

Figure 3:
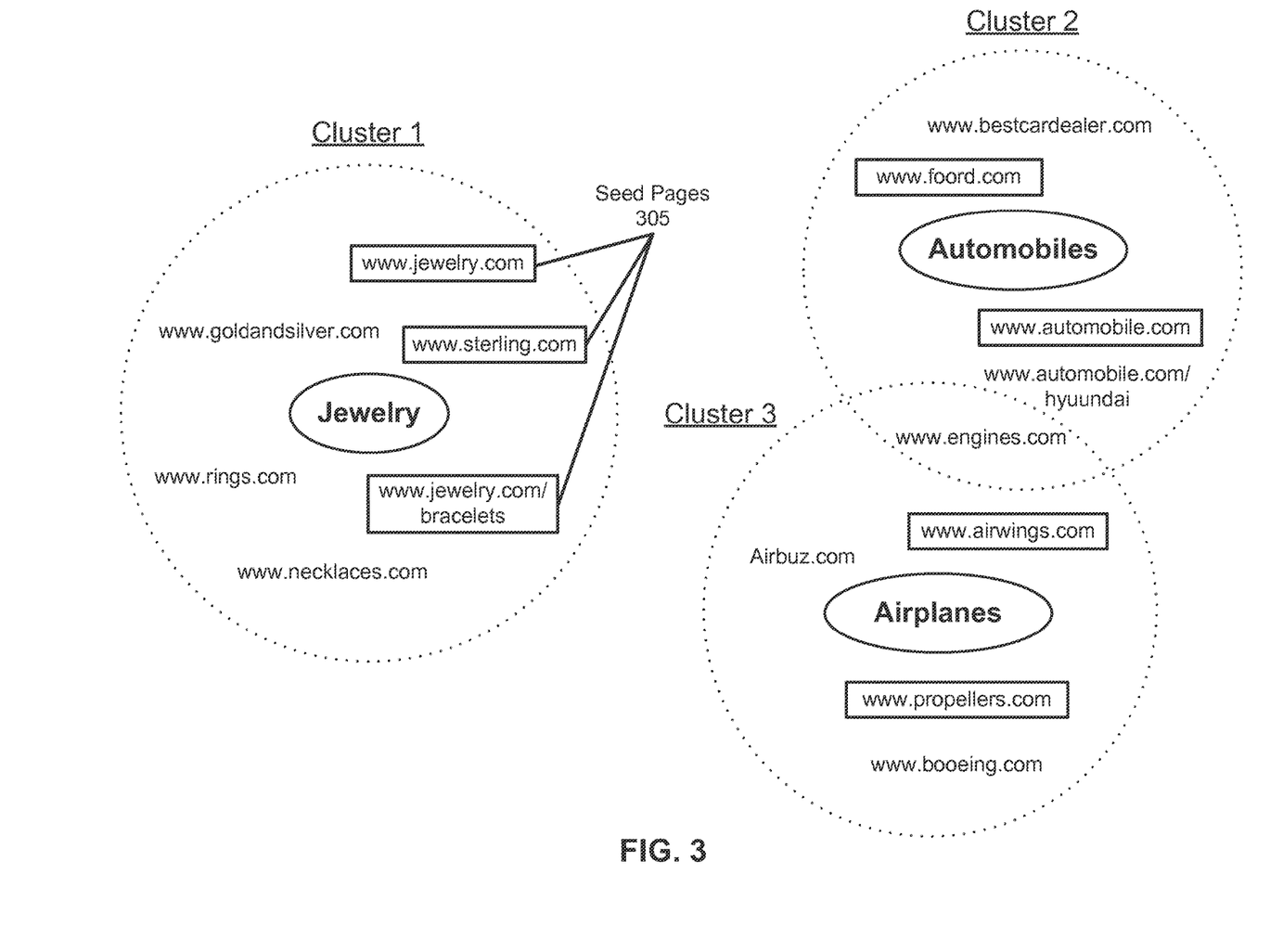
FIG. 3 shows an example diagram of interest topic clusters.

FIG. 3 shows an example diagram of interest topic clusters. In this example, interest topic clusters 242 include three interest topic clusters labeled "Jewelry," "Automobiles," and "Airplanes." In one embodiment, the pages associated with each interest topic cluster are identified by their URL address. The set of seed pages 305 associated with an interest topic cluster may be manually selected by an operator of the advertising system 110. A page associated with one interest topic cluster may also be associated with another interest topic cluster, as shown in the example URL "www.engines.com," which belongs to both the "Automobile" interest topic cluster and the "Airplanes" interest topic cluster. Moreover, as mentioned above, an interest topic cluster may include a page as well as the sub-URL or subdomains of the page.

Figure 4:
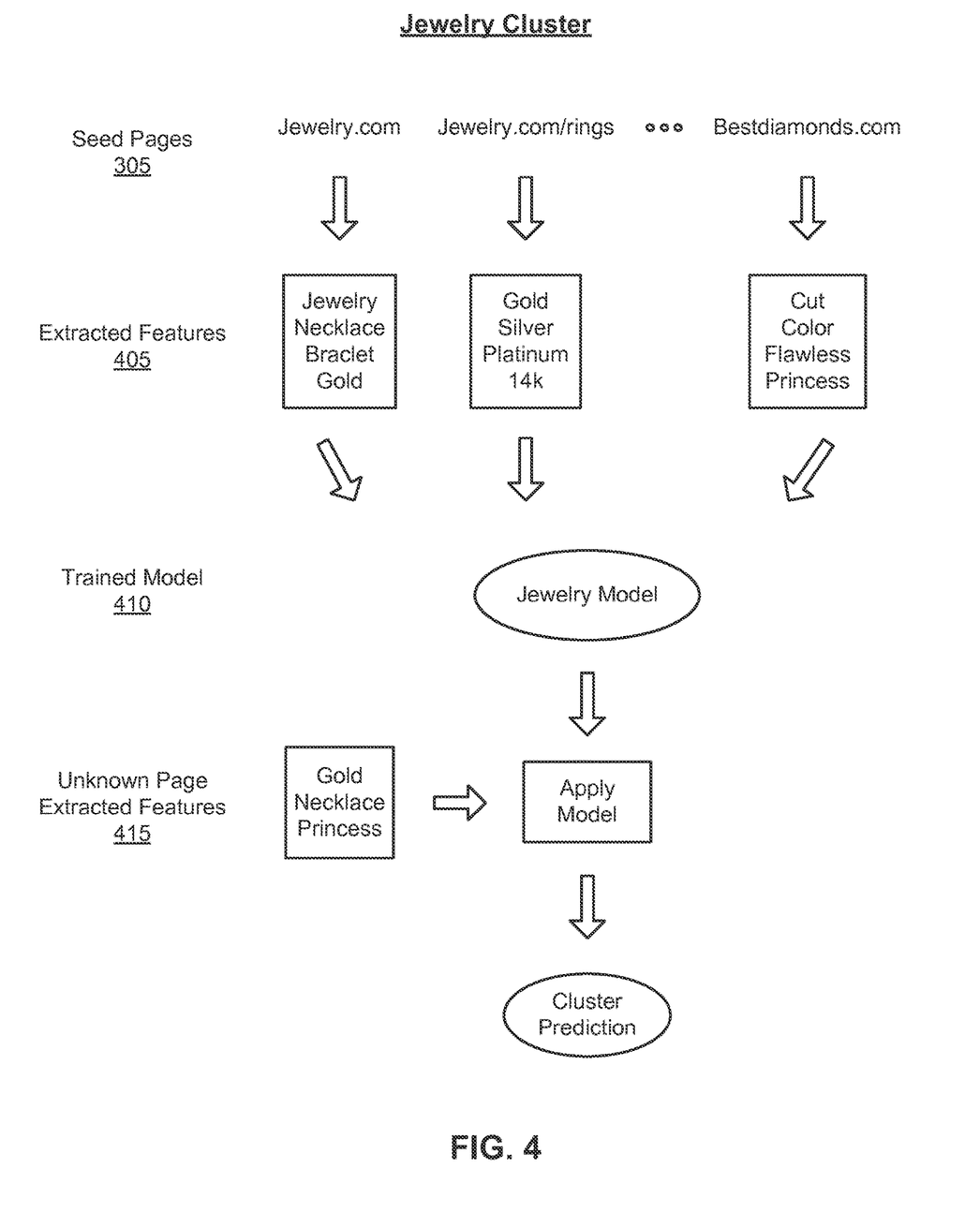
FIG. 4 shows an example process of training an interest topic cluster and determining whether an unknown page belongs to the interest topic cluster.

FIG. 4 shows an example process of training an interest topic cluster and determining whether an unknown page belongs to the interest topic cluster, for a "Jewelry" cluster. A set of seed pages is identified for the "Jewelry" cluster. The clustering module 222 extracts a set of features 405 from the seed pages. In this example, a set of keywords are extracted from each seed page, such as "Necklace," "Gold," and "14 k." The clustering module 222 may store keyword frequencies for each interest topic cluster in keyword frequencies 244. The set of extracted features are used to train a model 410 for the interest topic cluster, in this example for the "Jewelry" model. The clustering module 222 then extracts a set of features from an unknown page 415, and uses the extracted features of the unknown page as input to the trained model to determine whether the unknown page can be assigned to the "Jewelry" cluster.

In one embodiment, the clustering module 222 may train a Naïve Bayes clustering model that computes the probability of an unknown page belonging to an interest topic cluster given a set of extracted features of the unknown page. For example, if an unknown page has a sequence of keywords $x_1, x_2, \ldots, x_n$, and each interest topic cluster is denoted by $C_1, C_2, \ldots, C_m$, the probability of classifying an unknown page to an interest topic cluster $C_j$, given by $P(C_j|x_1, x_2, \ldots, x_n)$, may be computed by:

$$P(C_j | x_1, x_2, \ldots, x_n) = K \cdot P(C_j) \cdot \prod_{i=1}^{n} P(x_i | C_j)$$

where K is a normalization factor, $P(C_j)$ is the prior probability of cluster $C_j$, and $P(x_i|C_j)$ denotes the probability or frequency of keyword $x_i$ in cluster $C_j$. The probability or frequency of keyword $x_i$ in cluster $C_j$ may be estimated by statistics from keyword frequencies 244. In such an embodiment, if the probability of classifying an unknown page to an interest topic cluster $C_j$ is higher than a certain threshold, the clustering module 222 assigns the unknown page to cluster $C_j$.

In alternative embodiments, the clustering module 222 may train other textual or document clustering models, e.g., K-means clustering, to determine whether an unknown page belongs to an interest topic cluster given a set of extracted features.

Returning to FIG. 2, the user access identification module 224 receives and records user-page access data to each content provider page 112 in an interest topic cluster and generates an initial list of user-account associations by grouping the user-page access data by the advertising account associated with each content provider page 112. The user access identification module 224 stores the user-page access data to user access storage 246. The user access identification module 224 may use tracking methods, such as cookies or pixel fires, to identify user access to a page. For example, when a user visits a content provider 112, the content provider 112 may include a tracking pixel directing the client device 116 to indicate to the advertising system 110 that the client device 116 accessed that page on the content provider 112. The content provider 112 may interrogate the client device 116 to determine a unique user or session associated with the client device 116. While referred to herein by individual user identifications (e.g., as shown in FIG. 5), users may not be identified as specific individuals, but may be identified by device, browser session ID, browser cookie, or other another persistent identification.

Figure 5:
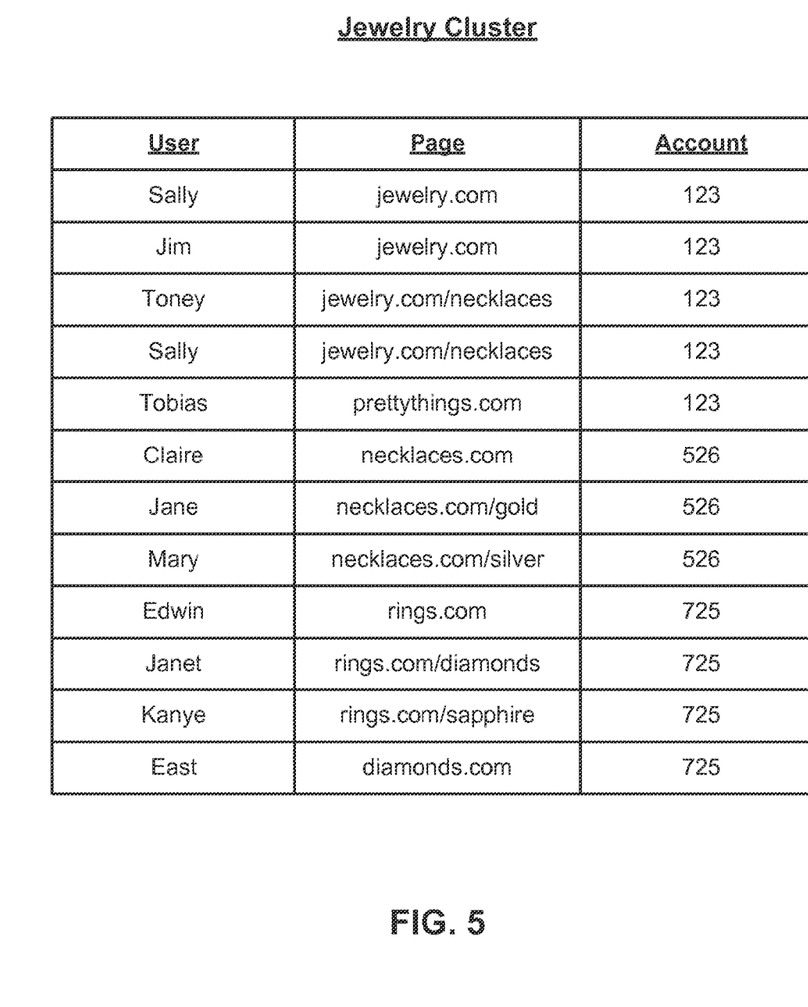
FIG. 5 is an example diagram of user-page-account associations for one interest topic cluster.

FIG. 5 is an example diagram of user-page-account associations for one interest topic cluster. An initial list of user-account associations is generated by grouping the list of user-page accesses by advertising account. As mentioned above, a content provider page 112 and its sub-URLs or sub-domains may be associated with the same advertising account. For example, the content provider page 112 "jewelry.com," and its sub-URL "jewelry.com/necklaces," which is also a page on the same domain and associated with the same content provider, are associated with the same advertising account "123." Moreover, different content provider pages 112 may be associated with the same advertising account. For example, "rings.com" and "diamonds.com" are different content provider pages 112 with different domains, but are associated with the same advertising account "725."

Returning to FIG. 2, the optimization module 226 optimizes the initial list of user-account associations generated by the user access identification module 224 and generates an optimized list of user-account associations such that a proportion of user-account associations for each advertising account in the optimized list is less than or equal to a predetermined threshold. This process is may be repeated for each interest topic cluster. The optimization module 226 stores the optimized lists in optimized interest list 248. The optimization module 226 reduces the initial list of user-account associations by removing a portion of user-account associations from the initial list of user-account associations.

In one embodiment, the optimization module 226 may solve the following integer linear programming problem:

$$\max_{u_k \in N, k=1,2,\ldots,p} \sum_{k=1}^{p} u_k$$

$$\text{subject to } u_k \leq f \cdot \left(\sum_{k=1}^{p} u_k\right), \forall k = 1, 2, \ldots, p$$

$$0 \leq u_k \leq r_k, \forall k = 1, 2, \ldots, p$$

where given p advertising accounts indexed by $k=1, 2, \ldots, p$, $r_k$ denotes the number of users in the initial list of user-account associations for account k, f denotes the threshold for the proportion of user-account associations for each advertising account, and $u_k$ denotes the optimized number of users in the optimized list of user-account associations for account k. In such an embodiment, the integer linear programming problem computes $r_k - u_k$ as the number of user-account associations to be discarded for account k, while retaining the maximum total number of user-account associations such that the proportion of user-account associations for each account is equal or less than a threshold f. In one embodiment, the value of f is 0.15. In this way, the optimized list maintains a broad selection of users across many different accounts, and is one way of reducing the number of user-account associations for an account.

Figure 6:
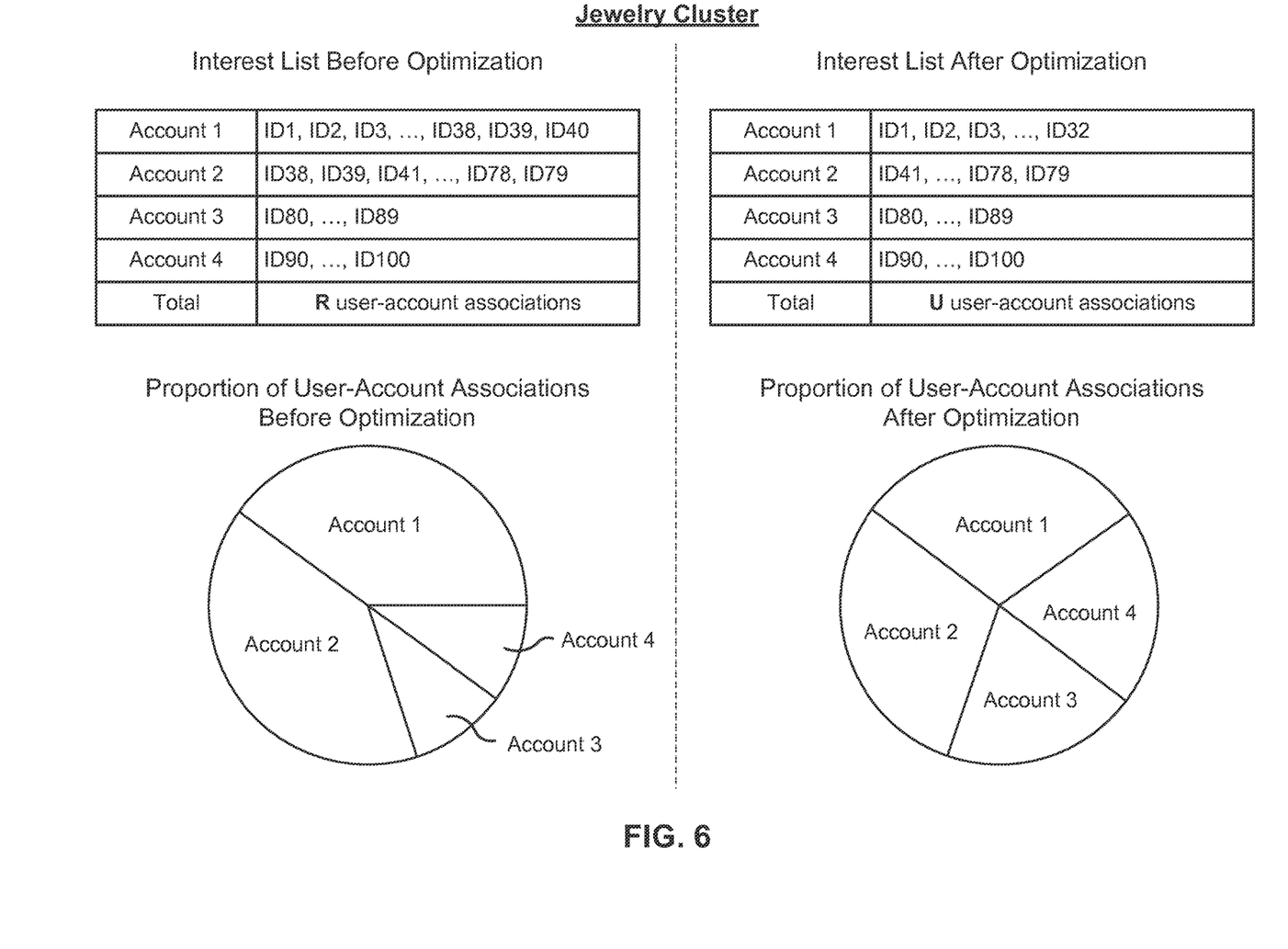
FIG. 6 conceptually illustrates optimizing the list of user-account associations such that all accounts are proportionately represented.

FIG. 6 conceptually illustrates optimizing the list of user-account associations such that all accounts are proportionately represented, for an example "Jewelry" cluster. The initial list of user-account associations before optimization has a disproportionate amount of user-account associations for advertising accounts "Account 1" and "Account 2," for an R number of total user-account associations. After optimizing the initial list of user-account associations, the optimization module 226 discards R-U user-account associations, such that the proportion of user-account associations for each advertising account is equal to or less than a threshold.

The optimization module 226 determines which user-account associations are discarded after determining how many associations are to be discarded from each advertising account. In one embodiment, the optimization module 226 may select to remove user-account associations for users that are identified for multiple advertising accounts to retain a maximum number of unique users in the optimized list of user-account associations. For example, in FIG. 6, since users "ID 38" and "ID 39" are identified for both "Account 1" and "Account 2" in the initial list of user-account associations, the optimization module 226 removes the user-account association for users "ID 38" and "ID 39" during the optimization process. In an alternative embodiment, if a user is identified for multiple advertising accounts, the optimization module 226 may discard the user-account association of the user for the account that is the most overweight in the number of user-account associations. In one embodiment, the optimization module 226 may rank user-account associations based on how frequent a user has accessed pages associated with an advertising account to identify users that express the most interest in products or services related to the interest topic. For each advertising account, the optimization module 226 may rank user-account associations based on access frequency of a user and may discard user-account associations with the least amount of visits. In another embodiment, the optimization module 226 may rank user-account associations based on how recently a user has accessed a page associated with an advertising account. For example, the optimization module 226 may rank user-account associations based on how recently a user has accessed pages associated with the advertising account and discard the user-account associations that have the least recent access records.

Returning to FIG. 2, the ad selection module 228 uses the optimized list of user-account associations generated by the optimization module 226 to target advertisements to users associated with the optimized list of the interest topic. In one embodiment, the ad selection module 228 may identify an advertisement opportunity for a user associated with the optimized list, identify an advertisement from ad campaigns 250 that targets the optimized list, and add the identified advertisement to an ad auction for the advertisement opportunity. In an alternative embodiment, the ad selection module 228 may also provide the optimized list to an advertiser 114 that uses the list to target the user with an advertisement associated with the interest topic. In this way, the optimized list may be used by advertisers to target users associated with the interest topic. Because the optimized list ensures that certain accounts are not overly represented in the list, the accounts may represent a more diverse set of content pages accessed by the users and can provide advertisers with some guarantee that the content pages accessed by users on the list are not primarily from just a few heavily-contributing content pages.

Figure 7:
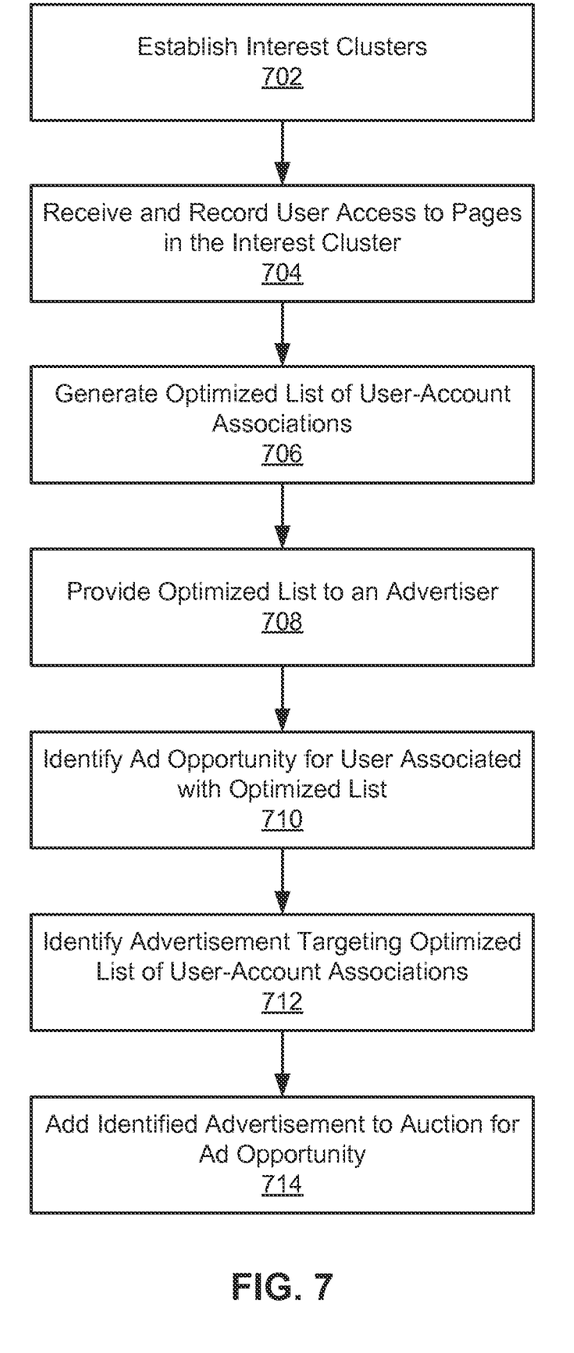
FIG. 7 is a flowchart illustrating a process of an advertising system generating a list of user-account associations used the list for advertisement targeting.

FIG. 7 is a flowchart illustrating a process of an advertising system generating a list of user-account associations used the list for advertisement targeting. Interest topic clusters are established 702 by identifying a cluster of pages associated with an interest topic. User access data to pages in the interest topic cluster are received and recorded 704. An optimized list of user-account associations is generated 706 such that the proportion of user-account associations for each account is equal to or less than a threshold. The advertising system 110 may provide 708 the optimized list to an advertiser 114, so the advertiser 114 may target users associated with the optimized list with advertisements provided by the advertising system 110. When the optimized list is provided to an advertiser 114, the advertising system 110 may indicate the availability of a proportionate list of user-account associations to the advertiser 114 without exposing the specific users in the optimized list. In another embodiment, the advertising system 110 may further provide proportions of user-account associations for each advertising account to the advertiser 114. For example, the advertising system 110 may provide an advertiser 114 an option to advertise to a list of users interested in a "Jewelry" interest cluster, but does not indicate to the advertiser who is on the list. Continuing the example, the advertising system 110 may also indicate that no more than 15% of the users displayed an interest in any given content owner, and that 15% of the users on the list are associated with "Jewelry" because of an access to jewelry.com, that 13% of the users on the list are associated with "Jewelry" because of an access to necklaces.com, and so forth.

The advertising system 110 may identify 710 an advertisement opportunity for a user associated with the optimized list, identify 712 an advertisement targeting the optimized list, and identify 714 an advertisement to auction for the advertisement opportunity. Alternatively, the advertising system 110 may provide the optimized list to an advertiser 114 that uses the list to target the user with an advertisement associated with the interest topic.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying a set of webpages associated with an interest topic, each webpage associated with an advertising account form a set of advertising accounts;
   receiving a set of user-webpage accesses for a plurality of users, each user-webpage access indicating a user access to a webpage in the set of webpages;
   grouping the user-webpage accesses in the set of user-webpages accesses by advertising account associated with the accessed webpage;
   generating an initial list of user-account associations that lists each advertising account and users associated with the advertising account based on the group user-webpage accesses;
   reducing the initial list of user-account associations to generate an optimized list of user-account associations, wherein the reducing comprises reducing a portion of user-account associations for each of one or more advertising accounts that have a proportion of user-account associations above a predetermined threshold; and
   using the optimized list to target a user with an advertisement associated with the interest topic, wherein using the optimized list comprises:
      identifying an advertisement opportunity for the user associated with the optimized list,
      identifying the advertisement targeting the optimized list, and
      adding the identified advertisement to an advertising auction for the advertisement opportunity.

2. The method of claim 1, wherein using the optimized list to target the user comprises:
   providing the optimized list to an advertiser that uses the optimized list to target the user with the advertisement associated with the interest topic.

3. The method of claim 1, wherein identifying the set of webpages associated with the interest topic comprises:
   identifying seed webpages associated with the interest topic, and assigning the seed webpages to the set of webpages;
   extracting a set of features from an unknown webpage;
   calculating a statistics using the set of features extracted from the unknown webpage; and
   assigning the unknown webpage to the set of webpages associated with the interest topic if the statistic meets a predetermined criteria.

4. The method of claim 3, wherein the set of features includes any one of keywords, bag of words, or n-grams of the unknown webpage.

5. The method of claim 3, wherein extracting the set of features comprises extracting a set of keywords from the unknown webpage, and calculating the statistic comprises calculating a probability that the unknown webpage belongs in the set of webpages based on frequencies of the set of keywords in the set of webpages.

6. The method of claim 1, wherein reducing the initial list of user-account associations comprises:
   solving the following integer linear programming problem $$\max_{u_k \in N, k=1,2,\ldots,p} \sum_{k=1}^{p} u_k$$

$$\text{subject to } u_k \leq f \cdot \left( \sum_{k=1}^{p} u_k \right), \forall k = 1, 2, \ldots, p$$

$$0 \leq u_k \leq r_k, \forall k = 1, 2, \ldots, p$$

for $u_k$, where $r_k$ is the number of users in the initial list of user-account associations for advertising account k in the set of advertising accounts, f is the predetermined threshold, and $u_k$ is the number of users in the optimized list of user-account associations for advertising account k in the set of advertising accounts; and
   discarding $r_k - u_k$ number of user-account associations from advertising account k in the set of advertising accounts.

7. A non-transitory computer-readable medium storing instructions for execution on a processor, the instructions when executed by the processor causing the processor to perform steps comprising:
   identifying a set of webpages associated with an interest topic, each webpage associated with an advertising account from a set of advertising accounts;
   receiving a set of user-webpage accesses for a plurality of users, each page user-webpage access indicating a user access to a webpage in the set of webpages;
   grouping the user-webpage accesses in the set of user-webpage accesses by advertising account associated with the accessed webpage;
   generating an initial list of user-account associations that lists each advertising account and users associated with the advertising account based on the grouped user-webpage accesses;

reducing the initial list of user-account associations to generate an optimized list of user-account associations, wherein the reducing comprises reducing a portion of user-account associations for each of one or more advertising accounts that have a proportion of user-account associations above a predetermined threshold; and using the optimized list to target a user with an advertisement associated with the interest topic, wherein using the optimized list comprises:
identifying an advertisement opportunity for the user associated with the optimized list,
identifying the advertisement targeting the optimized list, and
adding the identified advertisement to an advertising auction for the advertisement opportunity.

8. The non-transitory computer-readable medium of claim 7, wherein using the optimized list to target the user comprises:
providing the optimized list to an advertiser that uses the optimized list to target the user with the advertisement associated with the interest topic.

9. The non-transitory computer-readable medium of claim 7, wherein identifying the set of webpages associated with the interest topic comprises:
identifying seed webpages associated with the interest topic, and assigning the seed webpages to the set of webpages;
extracting a set of features from an unknown webpage;
calculating a statistic using the set of features extracted from the unknown webpage; and
assigning the unknown webpage to the set of webpages associated with the interest topic if the statistic meets a predetermined criteria.

10. The non-transitory computer-readable medium of claim 9, wherein the set of features includes any one of keywords, bag of works or n-grams of the unknown webpage.

11. The non-transitory computer-readable medium of claim 9, wherein extracting the set of features comprises extracting a set of keywords from the unknown webpage, and calculating the statistic comprises calculating a probability that the unknown webpage belongs in the set of webpages based on frequencies of the set of keywords in the set of webpages.

12. The non-transitory computer-readable medium of claim 7, wherein reducing the initial list of user-account associations comprises:
solving the following integer linear programming problem $$\max_{u_k \in N, k=1,2,\ldots,p} \sum_{k=1}^{p} u_k$$

$$\text{subject to } u_k \leq f \cdot \left(\sum_{k=1}^{p} u_k\right), \forall k = 1, 2, \ldots, p$$

$$0 \leq u_k \leq r_k, \forall k = 1, 2, \ldots, p$$

for $u_k$, where $r_k$ is the number of users in the initial list of user-account association for advertising account k in the set of advertising accounts, f is the redetermined threshold, and $u_k$ is the number of users in the optimized list of user-account associations for advertising account k in the set of advertising accounts; and discarding $r_k - u_k$ number of user-account associations from advertising account k in the set of advertising accounts.

13. A system comprising:
a processor configured to execute instructions;
a computer-readable medium containing instructions for execution on the processor, the instructions causing the processor to perform steps of:
identifying a set of webpages associated with an interest topic, each webpage associated with an advertising account from a set of advertising accounts;
receiving a set of user-webpage accesses for a plurality of users, each user-webpage accesses indicating a user access to a webpage in the set of webpages;
grouping the user-webpage accesses in the set of user-webpage accesses by advertising account associated with the accessed webpage;
generating an initial list of user-account associations that list each advertising account and users associated with the advertising account based on the grouped user-webpage accesses;
reducing the initial list of user-account associations to generate an optimized list of user-account associations, wherein the reducing comprises reducing a portion of user-account associations for each of one or more advertising accounts that have a proportion of user-account associations above a predetermined threshold; and
using the optimized list to target a user with an advertisement associated with the interest topic, wherein using the optimized list comprises:
identifying an advertisement opportunity for the user associated with the optimized list,
identifying the advertisement targeting the optimized list, and
adding the identified advertisement to an advertising auction for the advertisement opportunity.

14. The system of claim 13, wherein using the optimized list to target the user comprises:
providing the optimized list to an advertiser that uses the optimized list to target the user with the advertisement associated with the interest topic.

15. The system of claim 13, wherein identifying the set of webpages associated with the interest topic comprises:
identifying seed webpages associated with the interest topic, and assigning the seed webpages to the set of webpages;
extracting a set of features from an unknown webpage;
calculating a statistic using the set of features extracted from the unknown webpage; and
assigning the unknown webpage to the set of webpages associated with the interest topic if the statistic meets a predetermined criteria.

16. The system of claim 15, wherein the set of features includes any one of keywords, bag of words, or n-grams of the unknown webpage.

17. The system of claim 15, wherein extracting the set of features comprises extracting a set of keywords from the unknown webpage, and calculating the statistic comprises calculating a probability that the unknown webpage belongs in the set of webpages based on frequencies of the set of keywords in the set of webpages.

18. The system of claim 13, wherein reducing the initial list of user-account associations comprises:
solving the following integer linear programming problem $$\max_{u_k \in N, k=1,2,\ldots,p} \sum_{k=1}^{p} u_k$$

$$\text{subject to } u_k \leq f \cdot \left(\sum_{k=1}^{p} u_k\right), \forall\, k = 1, 2, \ldots, p$$

$$0 \leq u_k \leq r_k, \forall\, k = 1, 2, \ldots, p$$

for $u_k$, where $r_k$ is the number of users in the initial list of user-account associations for advertising account k in the set of advertising accounts, f is the predetermined threshold, and $u_k$ is the number of users in the optimized list of user-account associations for advertising account k in the set of advertising accounts; and discarding $r_k$-$u_k$ number of user-account associations from advertising account k in the set of advertising accounts.

\* \* \* \* \*